(12) United States Patent
Jallon et al.

(10) Patent No.: US 9,524,467 B2
(45) Date of Patent: Dec. 20, 2016

(54) METHOD FOR CONFIGURING A SENSOR DETECTION DEVICE, AND CORRESPONDING COMPUTER PROGRAM AND ADAPTIVE DEVICE

(75) Inventors: Pierre Jallon, Grenoble (FR); Florence Gris, Tullins (FR)

(73) Assignees: Commissariat à l'énergie atomique et aux énergies alternatives, Paris (FR); MOVEA, Grenoble (FR)

( * ) Notice: Subject to any disclaimer, the term of this patent is extended or adjusted under 35 U.S.C. 154(b) by 147 days.

(21) Appl. No.: 14/342,205

(22) PCT Filed: Aug. 29, 2012

(86) PCT No.: PCT/FR2012/051952
§ 371 (c)(1),
(2), (4) Date: Feb. 28, 2014

(87) PCT Pub. No.: WO2013/030508
PCT Pub. Date: Mar. 7, 2013

(65) Prior Publication Data
US 2014/0229410 A1 Aug. 14, 2014

(30) Foreign Application Priority Data
Aug. 29, 2011 (FR) ...................... 11 57611

(51) Int. Cl.
*G06F 17/00* (2006.01)
*G06N 7/00* (2006.01)
(Continued)

(52) U.S. Cl.
CPC .............. *G06N 7/00* (2013.01); *G06K 9/00335* (2013.01); *G06K 9/6297* (2013.01); *G06N 7/005* (2013.01); *G06N 99/005* (2013.01)

(58) Field of Classification Search
CPC ...................................................... G06N 7/005
(Continued)

(56) References Cited

U.S. PATENT DOCUMENTS 6,734,834 B1 *  5/2004  Baram ................ A61B 5/1101
                                                      345/156

OTHER PUBLICATIONS

Lukowicz et al., Continuous activity recognition in a maintenance scenario: combining motion sensors and ultrasonic hands tracking, 2012, Industrial and Commercial Application, Pattern Analysis and Applications, vol. 15, Issue 1, pp. 87-111.*

(Continued)

*Primary Examiner* — David Vincent
(74) *Attorney, Agent, or Firm* — Oblon, McClelland, Maier & Neustadt, L.L.P.

(57) ABSTRACT

A method for configuring a device for detecting a situation from a set of situations where a physical system comprises the following steps: reception of a learning sequence corresponding to a given situation of the physical system; determination of parameters of a hidden-state Markov statistical model recorded in the detection device and relating to the given situation, on the basis of a prior initialization of these parameters. The prior initialization comprises the following steps: determination of a plurality of probability distributions from the learning sequence; distribution of the probability distributions between the various hidden states of the statistical model in question by global optimization of a function of adaptation of these probability distributions to the various hidden states and to impossible transition constraints; and initialization of the parameters of the statistical model in question using given representative probability distributions for each hidden state of the statistical model in question.

12 Claims, 4 Drawing Sheets

Figure 1:
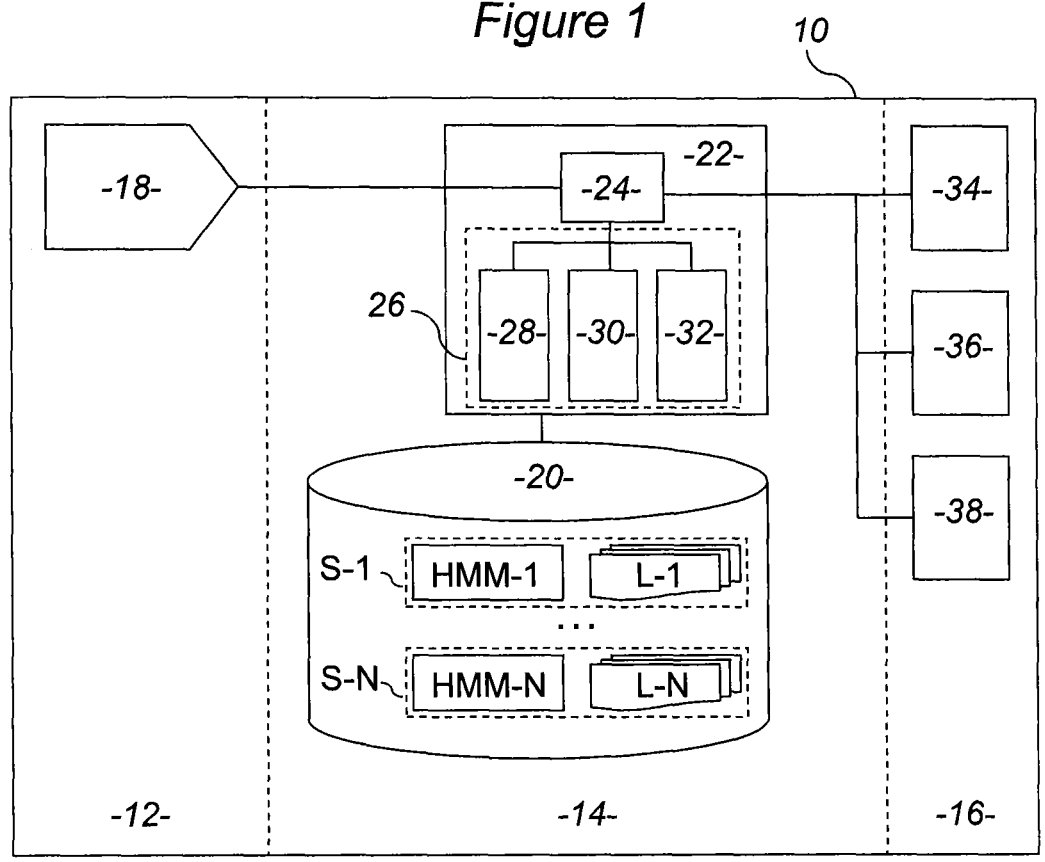

(51) Int. Cl.
  *G06N 99/00* (2010.01)
  *G06K 9/00* (2006.01)
  *G06K 9/62* (2006.01)
(58) Field of Classification Search
  USPC .............................................. 706/12, 45, 62
  See application file for complete search history.

(56) References Cited

OTHER PUBLICATIONS

U.S. Appl. No. 14/353,193, filed Apr. 21, 2014, Jallon.

Randons, G., et al., "Analysis, classification, and coding of multielectrode spike trains with hidden Markov models", Biological Cybernetics, vol. 71, pp. 359-373, (1994) XP 055050259.

Jallon, P., "A Bayesian approach for epileptic seizures detection with 3D accelerometers sensors", 32$^{nd}$ Annual International Conferences of the IEEE EMBS, pp. 6325-6328, (Sep. 4, 2010) XP 31794974.

Aradilla, G., et al., "An Acoustic Model Based on Kullback-Leibler Divergence for Posterior Features", IDIAP Research Report 06-60, pp. 1-8, (Jan. 2007).

Rasipuram, R., et al., "Integrating Articulatory Features Using Kullback-Leibler Divergence Based Acoustic Model for Phoneme Recognition", IEEE Internatinal Conference on, IEEE, Total 4 Pages, (May 22, 2011) XP 032001852.

Krishnamurthy, V., et al., "On-Line Estimation of Hidden Markov Model Parameters Based on the Kullback-Leibler Information Measure", IEEE Transactions on Signal Processing, vol. 41, No. 8, pp. 2557-2573, (Aug. 1993) XP 002043735.

Rabiner, L.R., et al., "An Introduction to Hidden Markov Models" IEEE ASSP Magazine, pp. 4-16, (Jan. 1986) XP 011353445.

Rabiner, L. R., "A Tutorial on Hidden Markov Models and Selected Applications in Speech Recognition", Proceedings of the IEEE, vol. 77, No. 2, pp. 257-286, (Feb. 1989) XP 002550447.

Jallon, P, et al., "Detection system of motor epileptic seizures through motion analysis with 3D accelerometers", 31$^{st}$ Annual International Conference of the IEEE EMBS, pp. 2466-2469, (Sep. 2-6, 2009) XP 031567495.

Nathan, K., et al., "Initialization of Hidden Markov Models for Unconstrained On-Line Handwriting Recognition", ICASSP Conference, Total 4 Pages, (1996).

Smyth, P., "Clustering Sequences with Hidden Markov Models", Advances in Neural Information Processing Systems, Total 7 Pages, (1996).

French Search Report Issued Mar. 29, 2012 in Application No. FR 1157611 Filed Aug. 29, 2011.

International Search Report Issued Jan. 28, 2013 in PCT/FR12/051952 Filed Aug. 29, 2012.

* cited by examiner

Figure 6A
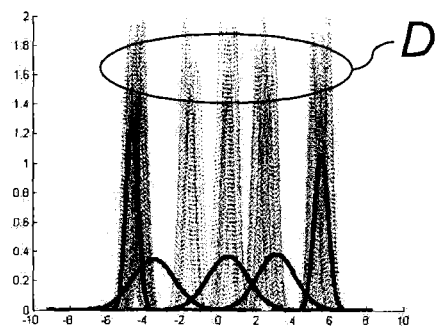
Figure 6B
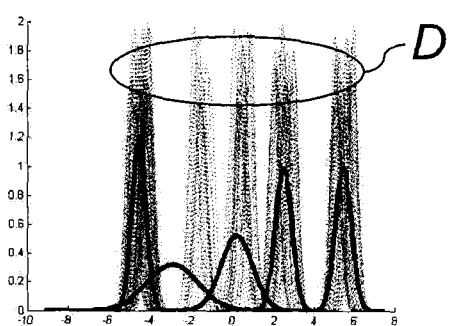
Figure 6C
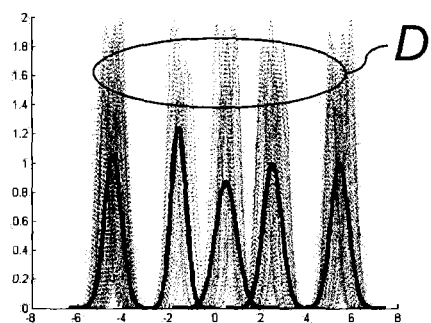
Figure 6D
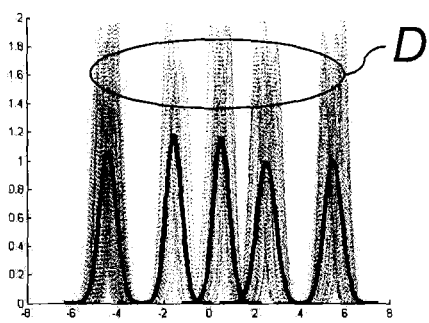
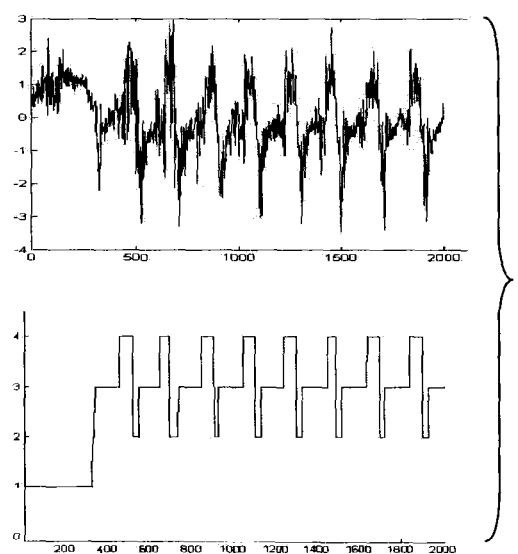
Figure 7

METHOD FOR CONFIGURING A SENSOR DETECTION DEVICE, AND CORRESPONDING COMPUTER PROGRAM AND ADAPTIVE DEVICE

The present invention concerns a method for configuring a detection device for detecting a situation from a set of situations wherein a physical system observed by at least one sensor is liable to be. It also concerns a corresponding computer program and an adaptive device for detecting a situation wherein a physical system observed by at least one sensor is.

"Physical system" means any system producing a physical output observable by a sensor, the system being assumed a priori to be able to be in a predetermined number of situations modelled by the detection device.

The physical system observed may for example be an inanimate object, such as a structure, the state of which it is wished to survey in order to detect any abnormalities or deformations by means of one or more sensors.

It may also be a case of an animate system, such as a person or an animal, for example suffering from a chronic illness with crisis situations detectable by means of a sensor. Depending on the sensor or sensors used, the detectable situations are variable and the applications many.

In particular, one promising application is the subject of the article by P. Jallon et al, entitled "Detection system of motor epileptic seizures through motion analysis with 3D accelerometers" published during the IEEE conference EMBC 2009. In this article, a device for detecting epileptic seizures using movement sensors, in particular 3D accelerometers, is based on hidden-state Markov statistical models, each best modelling, for a given situation, the statistical properties of observation sequences supplied by the sensors as they are expected for this situation. In concrete terms, each hidden-state Markov statistical model of this device corresponds to a predetermined possible situation of a person subject to epileptic seizures from, for example: a first seizure situation, a second seizure situation different from the first, or an absence of seizure situation. The principle of the detection then consists of selecting one of the possible situations, by comparing probabilities of these situations, knowing an observation sequence supplied by at least one accelerometer, the probabilities being calculated on the basis of each of the hidden-state Markov statistical models of the device.

The problem with such a detection device is that it is not adaptive. The parameters of these statistical models are predetermined, in particular recorded once and for all in the device, and must therefore be able to remain relevant when the detection device is used by different persons. Naturally, since each person reacts differently in epileptic seizure situations or in an absence of seizure situation, if the detection device is effective for one person, it will not necessarily be so for another.

More generally, configuring or reconfiguring a hidden-state Markov statistical model when at least one learning sequence considered to be representative of the system assumed to be modelled by the statistical model is available is known.

Thus the invention applies more particularly to a configuration method comprising the following steps:
 reception of a sequence of observation data from the physical system, referred to as a learning sequence and corresponding to a given situation of the physical system,
 determination, from the learning sequence, of parameters of a hidden-state Markov statistical model relating to the given situation, by prior initialisation of these parameters, and then updating of these initialised parameters.

Such a configuration method is for example proposed in the article by L. Rabiner, entitled "A tutorial on Hidden Markov Models and selected applications in speech recognition," Proceedings of the IEEE, vol. 77, no. 2, pp. 257-286, February 1989. In this article, the updating is carried out by an expectation-maximisation iterative algorithm, in particular the Baum-Welch algorithm. However, like any algorithm optimising by iterations, it is particularly sensitive to the prior initialisation of the parameters to be optimised. This is because, if it is poorly initialised, the result that it provides, although numerically stable, may prove to be significantly sub-optimal, for example by convergence towards a local maximum of the cost function that it optimises. At worst, it may even not converge numerically and provide aberrant parameters as an output.

In practice, the parameters to be initialised, and then optionally to be updated, for a hidden-state Markov statistical model, are:
 C, the number of hidden states of the statistical model in question,
 $\pi_1, \ldots, \pi_C$, the initial C probabilities, independent of any observation, of each hidden state of the statistical model in question,
 $(a_{i,j})_{1 \leq i,j \leq C}$, the matrix of the transition probabilities of each hidden state i towards each other hidden state j of the statistical model in question, and
 for each hidden state, the parameters of a probability distribution of the observation provided at each instant by the sensor, this observation being considered to be a random variable.

It will be noted that the Baum-Welch algorithm or any other known expectation-maximisation algorithm does not make it possible to update the number C of hidden states, this being considered to be a constant: C must therefore be fixed a priori at the initialisation and is not updated by the algorithm.

It should also be noted that the probability distribution of each hidden state of the statistical model in question may be multidimensional if the observation is multidimensional, that is to say if the data provided by the sensor (or the set of sensors) to the detection device are multi-value. For example, if the probability distribution is chosen as being the normal distribution, the parameters sufficient for defining it are its expectation and its variance, which may be scalars when the probability distribution is mono-dimensional, or respectively a vector and a matrix when the probability distribution is multidimensional.

It should also be noted that the parameters of the statistical model in question may be determined indifferently on one or more learning sequences, knowing that it is generally recommended to provide several sequences in order to statistically improve the adaptation of the statistical model in question to the reality of the observation sequences of the situation that it is supposed to model. For a single learning sequence, the cost function to be optimised by updating the parameters of the statistical model in question corresponds to the probability of observation of the learning sequence according to this model. For several learning sequences, the cost function becomes the product of the observation probabilities of the learning sequences, always according to this same model.

Finally, it should be noted that some impossible transition constraints between hidden states of the statistical model may make any initialisation of its parameters very difficult.

In order to overcome the inadequacies of the algorithm for updating the initialised parameters, one well known solution consists of providing several sets of initial parameters, executing the expectation maximisation algorithm on each set of initial parameters and finally selecting the one that supplies the best value for the optimised cost function. This solution reduces the risk of having an unfavourable case of execution of the algorithm but does not solve the problem of initialisation and greatly burdens the processing of the learning sequence.

Other solutions consist of seeking to directly improve the prior initialisation step.

One method for initialising hidden Markov models is for example described in the article by K. Nathan et al, entitled "Initialization of hidden Markov models for unconstrained on-line handwriting recognition", published during the ICASSP conference, 1996. In this article, each hidden state of a Markov model has several added normal probability distributions, the parameters of which are obtained by a prior classification of the observations. These normal distributions are common to all the states, the latter being differentiated only through weighting coefficients. The initialisation consists in fact of determining these weighting coefficients.

In the article by P. Smyth, entitled "Clustering sequences with hidden Markov models", published in Advances in Neural Information Processing Systems, 1996, the authors group together the learning sequences according to a certain measurement of similarity. For each of these groups, a model is learnt and the model calculated for the initialisation of the Baum-Welch algorithm is the concatenation of these various models. The drawback of this method is increasing the number of hidden states of the final model through the concatenation operation. Consequently the final model overdescribes the signals of the learning sequence which, in addition to increasing the complexity of the processing operations, may greatly impair the performances of the detection device. Furthermore, this document and the previous one do not take account of impossible transition constraints which may be imposed between certain hidden states of the model.

It may thus be wished to provide a configuration method that dispenses with at least some of the aforementioned problems and constraints.

A subject matter of the invention is therefore a method for configuring a device for detecting a situation from a set of situations wherein a physical system observed by at least one sensor is liable to be, comprising the following steps:
  reception of a sequence of observation data from the physical system, referred to as a learning sequence, supplied by the sensor and corresponding to a given situation of the physical system,
  determination, from the learning sequence, of parameters of a hidden-state Markov statistical model recorded in storage means of the detection device and relating to the given situation, by prior initialisation of these parameters, and then updating of these initialised parameters,
the prior initialisation comprising the following steps:
  the statistical model in question comprising a given number of hidden states and impossible transition constraints between certain hidden states, determination of a plurality of probability distributions from the learning sequence, by dividing the sequence into sub-sequences and allocating to each sub-sequence a probability distribution that models it statistically, the number of given probability distributions being greater than the number of hidden states of the statistical model in question,
  distribution of the given probability distributions determined between the various hidden states of the statistical model in question, by global optimisation of a function of adaptation of these probability distributions to the various hidden states and to the impossible transition constraints,
  determination, for each hidden state of the statistical model in question and from the probability distributions allocated to this hidden state, of a single probability distribution representing this hidden state, and
  initialisation of the parameters of the statistical model in question from the representative probability distributions determined,
the method further comprising a step of configuring the detection device so that the statistical model in question integrates the parameters determined by said prior initialisation and then said updating.

Thus the initialisation of the parameters of any one of the statistical models of the detection device can be envisaged on the basis of another very fine model applied to the learning sequence, this other very fine model being able to have a number of probability distributions much greater than the number of hidden states of the model in question. The reduction of this very fine model, by distribution of its probability distributions between the hidden states of the model in question while taking into account impossible transition constraints between certain hidden states by virtue of the global optimisation of an adaptation function, and then determination on the basis of this distribution of probability distributions representing hidden states, makes it possible to initialise the model in question finely, although it has a limited number of hidden states. Updating its parameters by known methods then produces an overall optimum result. Consequently the adaptation of the detection device to the physical system observed is improved thereby.

Optionally, the distribution comprises the execution of an iterative K-Means algorithm on a number of classes equal to the number of hidden states of the statistical model in question, this iterative algorithm comprising, at each iteration:
  for each probability distribution determined from the learning sequence, the association of this probability distribution with one of the classes, this association using the Kullback Leibler divergence and the impossible transition constraints, and
  the calculation, for each class, of a probability distribution representing its centre.

Optionally also, the distribution comprises an initialisation of the iterative K-Means algorithm consisting of:
  sorting the probability distributions in the sequential order of the sub-sequences with which they are associated in the learning sequence,
  distributing the probability distributions sorted in the classes in this sequential order, from the first to the last class,
  for each class thus initialised, determining a probability distribution representing its centre.

Optionally also, the function of adaptation of the probability distributions to the various hidden states and to the impossible transition constraints of the statistical model in question is, for a given distribution of the probability distributions determined between the various hidden states of the statistical model in question, this distribution being in accordance with the impossible transition constraints, a sum of Kullback Leibler distances between each probability distribution determined and each probability distribution representing the centre of the hidden state associated in this distribution.

Optionally also:
the function of adaptation of the probability distributions to the various hidden states and to the impossible transition constraints of the statistical model in question is, for each distribution "a" of the probability distributions determined from the learning sequence between the various hidden states of the statistical model in question, a product between a function taking into account the Kullback Leibler divergence between each probability distribution determined from the learning sequence and each probability distribution representing the centre of the hidden state that is associated with it in this distribution "a", and probabilities that each probability distribution determined from the learning sequence is associated with the hidden state defined by the distribution "a", knowing the hidden state associated by the distribution "a" with the probability distribution preceding it in a given order of the probability distributions issuing from the learning sequence,
the global optimisation of this adaptation function is achieved by execution of the Viterbi algorithm for the selection of a distribution that maximises it.

Optionally also, each probability distribution being a normal distribution, the probability distribution representing the centre of a class Ki is a normal distribution determined by the calculation of its expectation $\mu_i$ its variance $\Sigma_i$ according to the expectations $\mu_{i,j}$ and the variances $\Sigma_{i,j}$ of all the probability distributions of this class Ki, as follows:

$$\mu_i = \frac{1}{\text{Card}(Ki)} \sum_{j \in Ki} \mu_{i,j} \text{ and}$$

$$\Sigma_i = \frac{1}{\text{Card}(Ki)} \sum_{j \in Ki} (\Sigma_{i,j} + \mu_{i,j}^H \mu_{i,j}) - \mu_i^H \mu_i,$$

where Card is the "Cardinal" function and H is the Hermitian operator.

Optionally also, the hidden-state Markov statistical model relating to the given situation is a left/right or cyclic model wherein a sequence or a cycle of hidden states is imposed.

Another subject matter of the invention is a computer program downloadable from a communication network and/or recorded on a medium that can be read by computer and/or executed by a processor, comprising instructions for executing the steps of a configuration method for configuring as defined previously, when said program is executed on a computer.

Another subject matter of the invention is an adaptive device for detecting a situation from a set of situations wherein a physical system observed by at least one sensor is liable to be, from observation data of the physical system supplied by the sensor, comprising:
at least one sensor for supplying a sequence of observation data of the physical system,
means for storing, for each situation in the set of situations, a hidden-state Markov statistical model,
a computer, connected to the sensor and to the storage means, programmed to select one of the situations by comparing probabilities of these situations knowing the sequence of observation data, the probabilities being estimated on the basis of the statistical models stored, wherein the computer is further programmed to execute the steps of a method for configuring as previously defined, on reception of a sequence identified as a learning sequence corresponding to a given situation of the physical system.

Optionally, the sensor comprises at least one of the elements of the set consisting of a movement sensor with at least one measurement axis, a pressure sensor, a cardiometer, and a glycaemia sensor.

Figure 2:
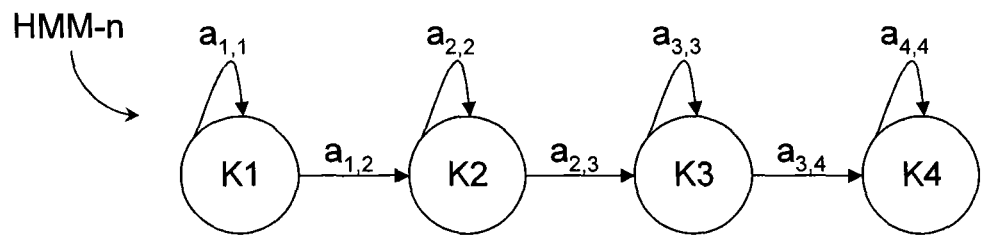
Figure 3:
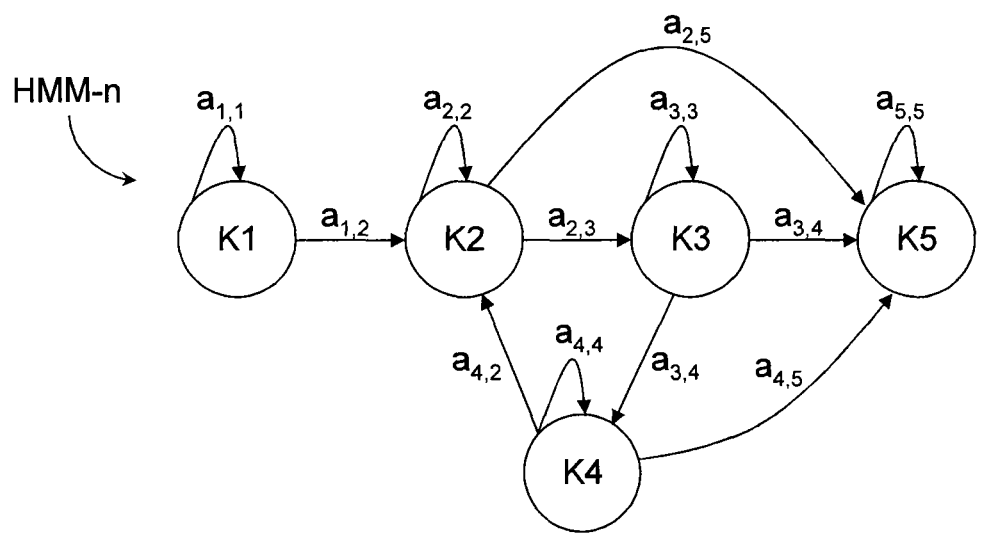
Figure 4:
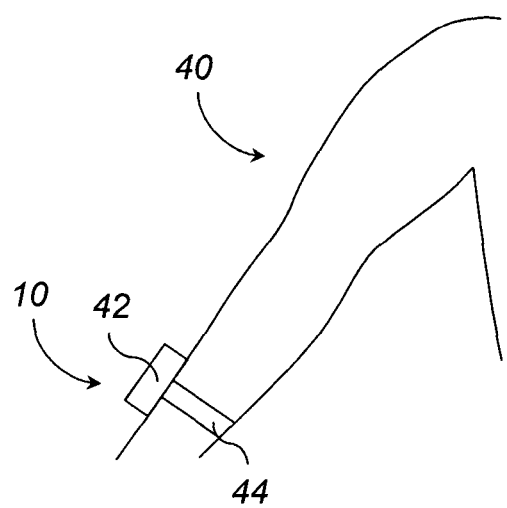
Figure 5:
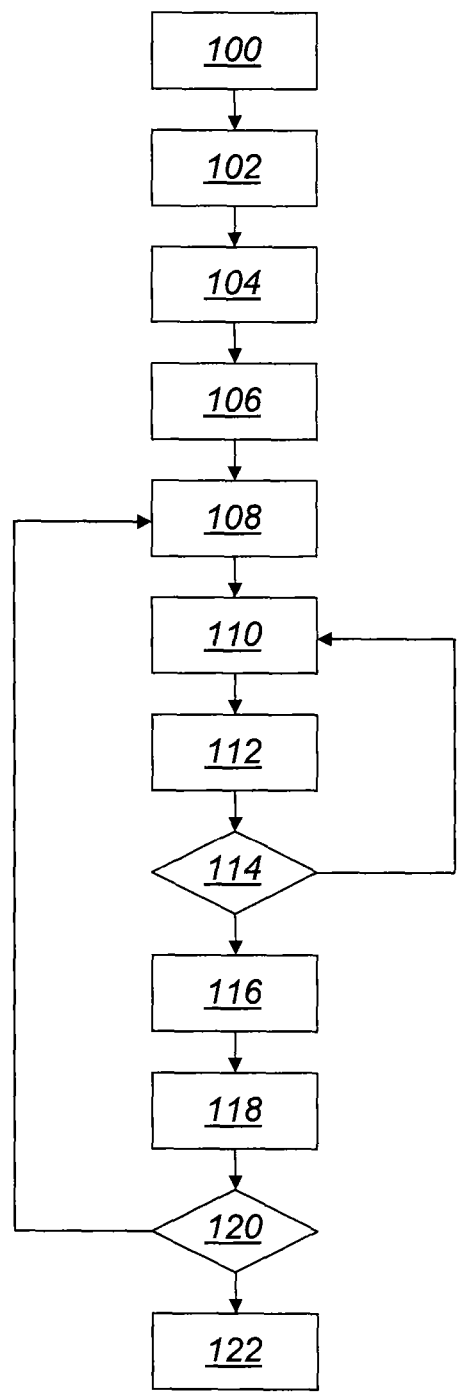

The invention will be better understood by means of the following description given solely by way of example and made with reference to the accompanying drawings, wherein:

FIG. 1 depicts schematically the general structure of a detection device according to one embodiment of the invention, FIGS. 2 and 3 illustrate examples of hidden-state Markov statistical models having transition constraints between hidden states and being able to be taken into account by the detection device of FIG. 1, FIG. 4 illustrates a particular use of the detection device of FIG. 1, FIG. 5 illustrates the successive steps of a method for configuring, for example the device of FIG. 1, according to one embodiment of the invention, FIGS. 6A to 6D illustrate, by means of diagrams, the intermediate results of a distribution step of the configuration method of FIG. 5, and FIG. 7 illustrates, by means of a diagram, a result of the distribution step of the configuration method of FIG. 5 obtained on the basis of a statistical model such as the one in FIG. 3.

The device 10 shown in FIG. 1 is an adaptive device for detecting a situation from a set of situations wherein a physical system observed by at least one sensor is liable to be. It comprises for this purpose an observation module 12, a processing module 14 and an interface module 16.

The observation module 12 comprises one or more sensors represented by the single reference 18 for observing the physical system.

Non-limitatively, a few examples of sensors and situations observable by means of these sensors are given:
the sensor 18 may for example comprise a movement sensor with one, two or three measurement axes, in particular a 3D accelerometer carried by a person, for determining a situation of epileptic seizure or absence of seizure in the person,
more generally, it may comprise a movement sensor for determining the activity of a mobile system in a set of predetermined activities, in particular repetitive or cyclic activities such as walking or swimming activities of a person,
it may comprise a cardiometer for determining a general physical activity of a person,
it may comprise a sensor for glycaemia in a person or animal suffering from diabetes in order to determine a situation of seizure or absence of seizure,
it may comprise a pressure sensor for determining the functioning situation (normal, limit, abnormal) of an installation under pressure,
etc.

The sensor 18 may also comprise several sensors each supplying observations which, combined, make it possible to envisage detecting more complex situations.

It makes measurements on the physical system in order to supply at least one observation signal, transmitted in the form of sequences of observation data to the processing module 14. The observation data may come directly from a sampling of the observation signal or be obtained after one or more processing operations, in particular one of more filterings, of this signal. It will thus be understood that the observation data may be mono- or multi-value, including when there is only one sensor 18 available.

The processing module 14 is an electronic circuit, for example that of a computer. It comprises storage means 20, for example a memory of the RAM, ROM or other type, wherein the parameters of hidden-state Markov statistical models are stored.

Each situation S-1, . . . , S-N designed to be detectable by the detection device 10 by means of the sensor 18 is modelled by a corresponding hidden-state Markov statistical model denoted HMM-1, . . . , HMM-N.

Any of the hidden-state Markov statistical models, denoted HMM-n and modelling the situation E-n, is defined by the following parameters:

Cn, the number of hidden states of this model HMM-n, $\pi_1, \ldots, \pi_{Cn}$, the initial Cn probabilities, independent of any observation, of each hidden state of this model HMM-n, $(a_{i,j})_{1 \leq i,j \leq Cn}$, the matrix of the transition probabilities of each hidden state i towards each other hidden state j of this model HMM-n, and for each hidden state, the parameters of a probability distribution of the observation supplied at each instant by the sensor.

By way of non-limitative example and to simplify the notations, the probability distribution of each hidden state i of the model HMM-n may be chosen from the family of normal distributions. In this case, it is defined by its expectation $\mu n_i$ and its variance $\Sigma n_i$. When the data supplied by the sensor 18 are multi-value, $\mu n_i$ is a vector comprising the same number of components and $\Sigma n_i$ a matrix comprising the same number of rows and columns as there are values supplied at each instant.

Moreover, some constraints may be imposed in the statistical model HMM-n, in particular constraints relating to the transitions $a_{i,j}$ from one hidden state to another, some of which may be prohibited. For example, in the case where the Cn hidden states of the model HMM-n represent elementary situations that are successive and ordered, or even cyclical and characteristic of a situation of the repetitive or pseudo-periodic activity type, the model HMM-n may itself be of the left/right or cyclic type.

One example of a left/right model HMM-n with four hidden states K1, K2, K3, K4 is illustrated in FIG. 2. It is suited to the modelling of a situation that may be broken down into four stationary and successive elementary states, ordered in time according to K1, K2, K3 and then K4. It may for example be a case of writing a letter of the alphabet by hand (the sensor being a movement sensor fixed to the hand that is writing), this action being able to be broken down into ordered phases that appear only once. For example, to write the letter G, the phases/elementary states may be as follows: (1) a descending round shape, (2) a short descent phase, (3) a rising round shape, (4) a horizontal return to the left. Thus the parameters of the Markov model with four corresponding states are constrained as follows:

$\pi_1=1$, $\pi_2=0$, $\pi_3=0$, $\pi_4=0$ (this writing action necessarily commences with a descending round shape), $\forall$ i,j $a_{i,j}=0$, except for: $a_{1,1}=1-\epsilon_1$, $a_{1,2}=\epsilon_1$, $a_{2,2}=1-\epsilon_2$, $a_{2,3}=\epsilon_2$, $a_{3,3}=1-\epsilon_3$, $a_{3,4}=\epsilon_3$, $a_{4,4}=1$.

More generally a left/right model HMM-n with Cn hidden states is constrained in the following manner:

$\pi_1=1$, $\forall$ i>1 $\pi_i=0$, $\forall$ i,j $a_{i,j}=0$, unless: $\forall$ i<Cn: $a_{i,i}=1-\epsilon_i$, $a_{i,i+1}=\epsilon_i$, $a_{Cn,Cn}=1$, where $\epsilon_i \in ]0,1[$.

An example of a cyclic model HMM-n with three cyclic hidden states K2, K3, K4 and five hidden states in total K1 to K5 is illustrated in FIG. 3. It is suited to the modelling of a physical activity of a person, detectable by means of an accelerometric sensor, the majority of these activities being periodic or pseudo-periodic. For example walking or swimming comprise successions of movements, respectively of the feet and head, which are repeated. The first state K1 represents the start of the periodic or pseudo-periodic activity in question (for example pushing on the edge of a pool in the case of swimming), the three successive states K2, K3 and K4 represent the periodic or pseudo-periodic phase of the activity proper, and the state K5, the end of or emergence from the activity.

Thus the parameters of this Markov model with five corresponding hidden states are constrained as follows:

$\pi_1=1$, $\pi_2=0$, $\pi_3=0$, $\pi_4=0$, $\pi_5=0$, (the activity in question necessarily commences with its start phase), $$\forall i, ja_{ij} = 0, \text{except: } a_{1,1} = 1 - \varepsilon_1, a_{1,2} = \varepsilon_1, a_{2,2} = 1 - \varepsilon_2 - \delta_2,$$

$$a_{2,3} = \varepsilon_2, a_{2,5} = \delta_2, a_{3,3} = 1 - \varepsilon_3 - \delta_3, a_{3,4} = \varepsilon_3, a_{3,5} = \delta_3,$$

$$a_{4,4} = 1 - \varepsilon_4 - \delta_4, a_{4,2} = \varepsilon_4, a_{4,5} = \delta_4, a_{5,5} = 1.$$

More generally a cyclic model HMM-n with Cn hidden states of which Cn-2 are cyclic is constrained as follows:

$\pi_1=1$, $\forall$ i>1 $\pi_i=0$, $\forall$ i,j $a_{i,j}=0$, except:

$a_{1,1}=1-\epsilon_1$, $a_{1,2}=\epsilon_1$, where $\epsilon_1 \in ]0,1[$, $\forall$ i, 1<i<(Cn-1): $a_{i,i}=1-\epsilon_i-\delta_i$, $a_{i,i+1}=\epsilon_i$, $a_{i,Cn}=\delta_i$, where $\epsilon_i, \delta_i \in ]0,1[^2$ and $\epsilon_i+\delta_i \leq 1$, $a_{Cn-1,Cn-1}=1-\epsilon_{Cn-1}-\delta_{Cn-1}$, $a_{Cn-1,2}=\epsilon_{Cn-1}$, $a_{Cn-1,Cn}=\delta_{Cn-1}$, $a_{Cn,Cn}=1$ where $\epsilon_{Cn-1}, \delta_{Cn-1} \in ]0,1[^2$ and $\epsilon_{Cn-1}+\delta_{Cn-1} \leq 1$.

The memory 20 may also store, in association with each model HMM-n, one or more learning sequences L-n. Each learning sequence of the model HMM-n is in fact an observation sequence supplied by the sensor 18 but where it is known a priori that it was extracted from the observation of the physical system when it was in the situation S-n. It can therefore be processed as soon as it is received by the processing module 14, or stored in memory 20 in relation to the model HMM-n with a view to subsequent processing, for a configuration or reconfiguration of the detection device 10 by updating parameters of the model HMM-n, as will be detailed with reference to FIG. 5.

The processing module 14 also comprises a computer 22, for example a computer central unit provided with a microprocessor 24 and a storage space for at least one computer program 26. This computer 22, and more particularly the microprocessor 24, is connected to the sensor 18 and to the memory 20.

The computer program 26 fulfils three main functions illustrated by modules 28, 30 and 32 in FIG. 1.

The first function, fulfilled by the detection module 28, for example in the form of an instruction loop, is a detection function for a situation wherein the physical system is, on reception of an observation sequence supplied the sensor 18. More precisely, the detection module 28 is programmed to select one of the situations S-1, . . . , S-N by comparing probabilities of these situations knowing the observation sequence, the probabilities being estimated on the basis of the stored statistical models HMM-1, . . . , HMM-N. The resolution of this selection by means of hidden-state Markov statistical models is well known and forms part of three major classes of problems solved by hidden Markov models, as mentioned in the aforementioned article by L Rabiner. The method employed will therefore not be detailed.

The second function, fulfilled by the recording module 30, for example in the form of an instruction loop, is a function of recording, in the memory 20, an observation sequence in relation to one of the situations S-1, . . . , S-N. This observation sequence then becomes a learning sequence to be used for configuring or reconfiguring the detection device 10.

The third function, fulfilled by the configuration module 32, for example in the form of an instruction loop, is a function of configuring the detection device 10 by updating the parameters of at least one statistical model HMM-n stored in memory 20 by means of a learning sequence or a set of corresponding learning sequences L-n. This function will be detailed with reference to FIG. 5.

In order to select which function the processing module 14 must fulfil, the interface module 16 may comprise a mode selector 34 controlled by a user, in particular the person wearing the detection device 10 him or herself, when the physical system observed is a person.

In a simple embodiment, it may be considered that the detection device 10 functions by default in detection mode, thus executing the detection module 28. One of the advantages of the detection device 10 being to detect at least one critical situation among a set of possible situations, such as for example an epileptic seizure in a wearer of the device subject to this type of situation, the interface module 16 may further comprise an alert trigger 36. This trigger may for example comprise a screen for displaying a warning message, a loudspeaker for emitting an audible signal, or a transmitter for transmitting a signal to a remote alarm.

On command from the user via the mode selector 34, the detection device 10 may momentarily pass into recording mode, when an observation sequence associated with a situation known to the physical system observed is supplied by the sensor 18 and must be recorded as a learning sequence in the memory 20. The detection device may then comprise a recording interface 38, by means of which the user defines the observation sequence (for example by marking its start and end) and associates it with one of the possible situations. The recording interface 38 may comprise, in a conventional fashion, a screen and/or entry means.

On command from the user via the mode selector 34 also, the detection device 10 may momentarily pass into configuration mode, when the user considers that he has sufficient learning sequences available in memory 20 to improve the adaptation of the detection device 10 to the physical system observed.

It should be noted that the observation 12, processing 14 and interface 16 modules are structurally separable. Thus the detection device 10 may be designed in a single piece or in several distinct hardware elements connected together by data transmission means with or without cable. In particular, the processing module 14 and optionally the interface module 16 may be implemented by computer. Only the observation module 12 is necessarily in the vicinity of or even in contact with the physical system being observed since it comprises the sensor or sensors.

In FIG. 4, a particularly compact embodiment is illustrated, for an application of monitoring of a person 40. According to this embodiment, the detection device 10 is entirely integrated in a box 42 worn by the person. The sensor is for example a 3D accelerometer and the situations observed are for example two in number: an epileptic seizure situation modelled by a statistical model HMM-1 and an absence of epileptic seizure situation modelled by a statistical model HMM-2. For this application, the box 42 is for example firmly held on an arm of the person 40 by means of a bracelet 44, so that the detection device 10 is worn like a watch.

In a variant (not illustrated), the box 42 could be held on the forehead of the person 40 by means of a headband for an application of detecting various swimming strokes (breaststroke, crawl, etc.), or on one of his legs for an activity-detection application (walking, long-distance race, sprint, etc.).

The functioning of the configuration module 32 will now be detailed with reference to FIG. 5 on the example of a configuration of the detection device 10 by updating the parameters of any one (HMM-n) of the statistical models stored in the memory 20. The execution of the configuration module 32 by the microprocessor 24 produces the sequence of steps illustrated in this figure.

During a first step 100, in a range of possible values of the number of hidden states that this model HMM-n may have, this number is fixed at Cn. One possible range of values is for example [3; 10]. For a first value, Cn may take the first value of this range.

During a step 102, a set L-n of learning sequences relating to the situation S-n modelled by the hidden-state Markov statistical model HMM-n is received by the microprocessor 24 for processing thereof by the configuration module 32. It may be received directly from the sensor 18, but more usually it is extracted from the memory 20 wherein the learning sequences may have been recorded at very different times, in particular during various occurrences of the situation S-n. In concrete terms, for an application of detecting epileptic seizures, knowing that the observation sequence transmitted by the sensor 18 may be processed by the detection module 28 in sliding observation windows of, for example, 45 seconds, at the rate of 25 samples per second, each learning sequence may for its part represent several minutes of observation. Thus, in total, a set of learning sequences may last for several tens of minutes, or even an hour or more.

During the following steps 104 and 106, a plurality of probability distributions is determined from the learning sequence, the number Ln of probability distributions determined being greater than or even very large compared with Cn.

More precisely, during step 104, the number Ln of probability distributions to be determined may optionally be obtained by dividing all the learning sequences into sub-sequences each of one second. In the aforementioned example, this gives sub-sequences of 25 samples. This is because, in general, a sub-sequence of 25 mono- or multi-value data may suffice to determine a probability distribution, in particular a normal distribution, statistically modelling this sub-sequence correctly. The learning sequence may moreover be divided into sub-sequences with or without overlaps between successive sub-sequences.

Thus, during step 106, with each sub-sequence there is associated a probability distribution corresponding to it, for example a normal distribution of parameters $\mu n_l$ (expectation) and $\Sigma n_l$ (variance). At this stage of the method, the determination of the Ln probability distributions and therefore of their parameters $\mu n_l$ and $\Sigma n_l$ is simple: it suffices to calculate the mean and variance of each sub-sequence, considered as estimators of $\mu n_l$ and $\Sigma n_l$.

During this same step, the Ln probability distributions are sorted. When the Markov model HMM-n does not a priori comprise any constraint, for example in the case of a statistical model for detecting epileptic seizures, the sorting may be done in increasing order of the first component of the expectation parameters $\mu n_l$. In the particular case of mono-dimensional learning sequences, the sorting is then done in increasing order of the expectations. This gives for example a distribution D such as the one illustrated in FIGS. 6A to 6D.

On the other hand, when the Markov model HMM-n comprises constraints a priori, in particular time constraints between hidden states such as those illustrated in FIGS. 2 and 3 preventing certain transitions, the sorting consists preferably of preserving these constraints. Thus, in the particular cases of FIGS. 2 to 3 where a certain sequence of the hidden states of the model HMM-n is imposed, the chronology of the Ln sub-sequences issuing from all the learning sequences is preserved.

During the following step 108, an initial distribution of the probability distributions determined is made between the Cn hidden states of the statistical model HMM-n. This distribution is done on the basis of the previous sorting (in particular to comply with the sequence of states when the model HMM-n comprises such a constraint a priori). For example, if Ln is a multiple of Cn, that is to say if $\exists k/Ln=k\cdot Cn$, the first k probability distributions can be attributed to a first hidden state, the following k to a second and so on as far as a last hidden state. If Ln is not a multiple of Cn, the distribution can be done on the same basis, for example by ignoring the last sub-sequences. This step corresponds to an initial classification of the Ln probability distributions into Cn classes by equal distribution, each class corresponding to a hidden state.

During the following step 110, for each class Ki ($1 \le i \le Cn$) and on the basis of a calculation of mean of the probability distributions allocated to this class Ki, a probability distribution representing its centre is determined. Several solutions naturally come to mind for determining simply the parameters of such a centre. It would in particular be possible to calculate the mean or median of each of the parameters (expectation and variance in the case of normal distributions) of the probability distributions of the class Ki independently of the others, but this would lead to a sub-optimum estimation of the centre.

Another less obvious solution is preferred. It will now be detailed. Let Y be a random variable according to the probability distribution of this centre. If this centre must represent the mean of the probability distributions of class Ki, then $$Y = \sum_{l \in Ki} 1(X = l) Z_l$$

can be written, where $Z_l$ is a random variable that follows the normal distribution of index I and parameters $\mu n_{i,l}$ and $\Sigma n_{i,l}$ of class Ki, and where X is a random variable that is equal to I if Y follows the same probability distribution as $Z_l$.

The probability distribution of the centre of class Ki is a sum of normal distributions which is possible to estimate, but which is also possible to approximate simply and cleverly by means of a normal distribution of parameters $\mu n_i$ and $\Sigma n_i$. The following then comes:

$$\mu n_i = E_{X,Z}(Y) = E_{X,Z}\left(\sum_{l \in Ki} 1(X = l) Z_l\right) = \sum_{l \in Ki} E_{X,Z}(1(X = l)) E_{X,Z}(Z_l),$$

from which $$\mu n_i = \frac{1}{\text{Card}(Ki)} \sum_{l \in Ki} \mu n_{i,l}, \quad (1)$$

where Card is the "Cardinal" function
and $$\Sigma n_i = E_{X,Z}((Y - E_{X,Z}(Y))^H (Y - E_{X,Z}(Y))) =$$
$$E_{X,Z}(Y^H Y) - E_{X,Z}(Y)^H E_{X,Z}(Y),$$

$$\Sigma n_i = E_{X,Z}\left(\left(\sum_{l \in Ki} 1(X = l) Z_l\right)^H \left(\sum_{m \in Ki} 1(X = m) Z_m\right)\right) - \mu n_i^H \mu n_i,$$

$$\Sigma n_i = \sum_{l,m \in Ki} E_{X,Z}(1(X = l) 1(X = m) Z_l Z_m) - \mu n_i^H \mu n_i,$$

$$\Sigma n_i = \frac{1}{\text{Card}(Ki)} \sum_{l \in Ki} E_{X,Z}(Z_l^H Z_l) - \mu n_i^H \mu n_i, \text{ from which}$$

$$\Sigma n_i = \frac{1}{\text{Card}(Ki)} \sum_{l \in Ki} (\Sigma n_{i,l} + \mu n_{i,l}^H \mu n_{i,l}) - \mu n_i^H \mu n_i, \quad (2)$$

where H is the Hermitian operator.

Equations (1) and (2) show that, as the centre of any class Ki is cleverly defined, it is possible to simply calculate its normal-distribution parameters $\mu n_i$ and $\Sigma n_i$ from the parameters $\mu n_{i,l}$ and $\Sigma n_{i,l}$ of the normal distributions of class Ki.

During a following step 112, on the basis of the Cn centres determined at the previous step, a new distribution of the Ln probability distributions determined at step 106 is performed using a "distance" function between normal probability distributions.

For this purpose, a "distance" function between normal distributions is defined on the basis of the Kullback Leibler divergence. Since this divergence is not commutative, it is not strictly a distance, but all the same it constitutes a model that can be used for this classification step. The Kullback Leibler divergence is written, for two probability distributions p and q:

$$D_{KL}(p \| q) = \int \log\left(\frac{p(u)}{q(u)}\right) p(u) du.$$

For normal distributions $pn_l$ and $pn_k$ of respective parameters $\mu n_l, \Sigma n_l$ and $\mu n_k, \Sigma n_k$ it takes the following form:

$$D_{KL}(pn_l \| pn_k) =$$
$$\frac{1}{2}\left(\log\left(\frac{|\Sigma n_k|}{|\Sigma n_l|}\right) + Tr(\Sigma n_k^{-1} \Sigma n_l) + (\mu n_l - \mu n_k)^H \Sigma n_k^{-1} (\mu n_l - \mu n_k) - N\right)$$

where $|E|$ is the absolute value of the determinant of the matrix $\Sigma$, Tr the Trace function and N the number of components of the vector $\mu n_l$ or $\mu n_k$.

More precisely, in a particular case where no a priori constraint is imposed in the sequence of the hidden states of the model HMM-n, for each probability distribution $\phi(l)$, $1 \le l \le Ln$, determined at step 106, it is possible to calculate its "distance" with respect to each of the centres denoted c(i), $1 \le i \le Cn$, and the class Ki of the closest centre is then allocated to it.

However, this method is not suitable in cases where constraints are imposed in the sequence of the hidden states of the model HMM-n since this new distribution, probability distribution by probability distribution and for each independently of the others, does not precisely take account of the constraints. In particular, this method is not suitable for a model HMM-n such as the one illustrated in FIG. 2 or 3.

According to another possible and advantageous embodiment, it is then therefore chosen to optimise globally the new distribution of the probability distributions in the classes Ki, rather than probability distribution by probability distribution. This is done by global optimisation of a function of adaptation of these probability distributions to the various hidden states and to the impossible transition constraints.

By denoting generically "a" any distribution function that associates each probability distribution $\phi(I)$, $1 \leq I \leq Ln$ (that is to say each index I), with a class Ki, $1 \leq i \leq Cn$ (that is to say each index i), represented by its centre c(i), $1 \leq i \leq Cn$, the function of adaptation of the probability distributions to the various hidden states knowing a given distribution a may take the following form, that is to say a sum of Kullback Leibler distances:

$$F(a) = \sum_{l=1}^{Ln} D_{KL}(\varphi(l) \| c(a(l))).$$

The distribution function "â" to be adopted is therefore the one that minimises the adaptation function F while satisfying the constraints of the model HMM-n. The adaptation function F is not minimised over all the possible distributions but only over those that satisfy the constraints of the model HMM-n in question.

Thus, in the case of a left/right statistical model such as the one in FIG. 2 for example, the distribution functions that satisfy the constraints of the model are those that have the property of being increasing in steps. By denoting the Cn−1 step transitions as $L_1, \ldots, L_{C_{n-1}}$, the distribution functions that satisfy the constraints of the model are those that satisfy the following property P:

$\forall l, l < L_1 \Rightarrow a(l) = 1$, $\forall l, L_{i-1} < l < L_i \Rightarrow a(l) = i$ $\forall l, L_{C_{n-1}} < l < Ln \Rightarrow a(l) = Cn.$ Therefore the distribution function "a" to be adopted is the one that satisfies:

$$\hat{a} = \underset{a \text{ satisfying } P}{\operatorname{Argmin}} [F(a)] = \underset{a \text{ satisfying } P}{\operatorname{Argmin}} \left[ \sum_{l=1}^{Ln} D_{KL}(\varphi(l) \| c(a(l))) \right].$$

In this case, the optimisation consists of seeking the instants of state changes, that is to say the values of $L_1, \ldots, L_{C_{n-1}}$, which minimise the function F. In practice, as long as the number of hidden states of the model HMM-n is not too high, it is possible to calculate F(a) for all the possible distributions "a" satisfying the property P, the combinations of values possible for $L_1, \ldots, L_{C_{n-1}}$ not being too numerous. However, as soon as this number increases, this way of proceeding quickly becomes too complex to implement. Furthermore, as soon as the constraints are no longer as simple as those of a left/right model, for example in the case of a cyclic model or other, this way of proceeding is also difficult to implement.

On the other hand, as long as the Markov model HMM-n is of first order, that is to say as long as the a posteriori probability of a hidden state of the model is dependent only on only one other state, it is possible to model the sequence a(1), . . . , a(Ln) of the distributions by a first-order Markov chain the transition probabilities of which comply with the constraints of the model HMM-n to be estimated, that is to say some of these transitions have a zero probability.

One solution for globally optimising the new distribution of the probability distributions in the classes Ki during step 112 is then to introduce a term relating to the probabilities of transition from one state to another for each sub-sequence with respect to the following in the expression of the adaptation function. For example, the latter may take the following form:

$$F'a = F(a) - \sum_{l=2}^{Ln} \log(p(a(l) | a(l-1))) - \log(p(a(1)))$$

$$= \sum_{l=1}^{Ln} [D_{KL}(\varphi(l) \| c(a(l))) - \log(p(a(l) | a(l-1)))] +$$

$$D_{KL}(\varphi(1) \| c(a(1))) - \log(p(a(1)))$$

The distribution function "a" to be adopted is then the one that satisfies:

$$\hat{a} = \underset{a}{\operatorname{Argmin}}[F'(a)]$$

or equivalently $$\hat{a} = \underset{a}{\operatorname{Argmax}}[-F'(a)].$$

There have thus been introduced into the adaptation function F' terms that make it possible to eliminate the distributions not satisfying the impossible transition constraints of the model HMM-n in question by diverging towards infinity at least one of the terms in log(p(a(l)|a(l−1))). In particular, in the case of a left/right Markov statistical model, p(a(l)|a(l−1))=0 if a(l) is different from a(l−1) and from a(l−1)+1.

Even more cleverly, the adaptation function may take the following form:

$$F''(a) = \exp(-F'(a))$$

$$= p(a(1)) \cdot \exp(-D_{KL}(\varphi(1) \| c(a(1)))) \prod_{l=2}^{Ln} p(a(l) | a(l-1)) \cdot$$

$$\exp(-D_{KL}(\varphi(l) \| c(a(l)))).$$

The distribution function "a" to be adopted is then the one that satisfies:

$$\hat{a} = \underset{a}{\operatorname{Argmax}}[F''(a)].$$

The function F" to be optimised, or more precisely to be maximised, is thus a function defined for each distribution "a" on the basis of the product of the probabilities that each sub-sequence (and therefore its associated probability distribution) is associated with the hidden state defined by the distribution "a" knowing the hidden state associated with the previous sub-sequence (and therefore its associated probability distribution) by the distribution "a", this probability product being weighted by the product of the terms $\exp(-D_{KL}(\phi(l)\|c(a(l))))$ involving the Kullback Leibler distances between the probability distribution of each sub-sequence of index I and that of the centre of the class Ki (i=a(l)) to which it is allocated in the distribution "a".

Considering these terms $\exp(-D_{KL}(\phi(l)\|c(a(l))))$ to be similar to a posteriori probabilities of observations in the light of the hidden states, and in accordance with the teaching of the article by L. Rabiner and B. Juang entitled "An introduction to Hidden Markov Models", published in IEEE ASSP Magazine, pages 4-16, January 1986, or more precisely in accordance with what is detailed on pages 7 to 11 of this article with reference to "problem 2" to be solved, it becomes possible to solve the optimisation problem â=Argmax[F"(a)] by means of the Viterbi algorithm through a search for an optimum path in the sequence of possible states. More precisely, remarking that the expression F"(a) is similar to that of Pr(O,1/λ) in this article by L. Rabiner and B. Juang, by replacing $\pi_{i1}$ with p(a(1)), $a_{il}$ with p(a(l)/a(l−1)) and $b_{il}(O_l)$ with $\exp(-D_{KL}(\phi(l)\|c(a(l))))$, seeking the distribution â that maximises the F"(a) amounts to applying the Viterbi algorithm as proposed on page 11 ("box 2") of this article. The optimum distribution a resulting from this application of the Viterbi algorithm is supplied as a new distribution at the output of step 112.

Following steps 110 and 112, step 114 is passed to during which a stop criterion comprising at least one of the following two conditions is tested:
the new distribution, obtained at the end of step 112, of the Ln probability distributions determined at step 106 is unchanged compared with the previous distribution (i.e. initial distribution of step 108 or distribution obtained at a previous execution of step 112),
steps 110 and 112 were repeated an Nmax number of times, Nmax being a predetermined constant.

If the stop criterion is not satisfied, the configuration module 32 returns at step 110 for a new execution of steps 110 and 112. Otherwise it passes to a step 116 of initialisation of the parameters of the statistical model HMM-n by means of the result of the loop of steps 110 to 114.

It should be noted that the loop of steps 110 to 114 constitutes an implementation of the K-means algorithm for the non-supervised automatic classification of the Ln normal probability distributions in Cn classes corresponding to the Cn hidden states of the model HMM-n. The result of this application of the algorithm of the K-means to the Ln probability distributions determined at step 106 is an optimised distribution of these probability distributions between the Cn hidden states of the statistical model HMM-n. Furthermore, each centre of parameters $\mu n_i$ and $\Sigma n_i$ calculated at the last execution of step 110 constitutes a single probability distribution representing the class (i.e. the hidden state) of which it is the centre.

The initialisation 116 of the parameters of the statistical model HMM-n is done, on the basis of the aforementioned result, in the following fashion:
the number of hidden states of the model HMM-n initialised is fixed at the value Cn,
the initial Cn probabilities $\pi_1, \ldots, \pi_{Cn}$ of the model HMM-n are initialised taking account of its constraints, for example by considering $\pi_1=1$ and $\forall$ i>1, $\pi_i=0$,
the matrix of the transition probabilities $(a_{i,j})_{1 \leq i,j \leq Cn}$ of the model HMM-n is initialised to a matrix the diagonal coefficients of which are equal to a first value close to 1, in particular between 0.8 and 1, and the other coefficients of which, when they are not a priori constrained at a zero value, are equal to a second value close to 0, in particular between 0 and 0.2, and
the parameters of the probability distribution of the observation supplied in each instant by the sensor 18 for the hidden state Ki are initialised to those, $\mu n_i$ and $\Sigma n_i$, of the centre, calculated at the last execution of the step 110, of this hidden state.

Following this initialisation step 116, a step 118 of updating is passed to, from all the learning sequences, the initialised parameters of the model HMM-n. This updating is carried out, as indicated previously, by executing the expectation-maximisation iterative algorithm, in particular the Baum-Welch algorithm, over all the learning sequences. Because of the relevance of the initialisation described previously, this step supplies parameters of the model HMM-n that are optimum overall in the light of all the learning sequences, for a given number Cn of hidden states.

During the following step 120, a test is carried out in order to determine whether the succession of steps 108 to 118 must once again be executed for a new value of Cn. Cn is for example incremented by one unit and, if it remains in the aforementioned range of possible values, the method is resumed at step 108. Otherwise a last step 122 is passed to of configuring the detection device 10 so that the statistical model HMM-n includes the parameters finally determined.

More precisely, during this last step 122, several sets of parameters are in competition, corresponding to several values of Cn. It is then a case of selecting one of them. The configuration module 32 may for example adopt the one that gives the best value of the cost function used at the execution 118 of the Baum-Welch algorithm. Then this set of parameters finally determined for the statistical model HMM-n is recorded in the memory 20.

FIG. 6A illustrates, by means of a diagram, the result of step 108 and of the first execution of step 110 on a set of Ln normal distributions, in accordance with what could actually be obtained from a learning sequence of an epileptic seizure situation, previously sorted for Cn=5. The five centres of the five classes, wherein the Ln normal distributions are equally distributed, are shown in thick lines.

FIGS. 6B, 6C and 6D illustrate respectively what these five centres become after first, second and third iterations of the loop of steps 112-114-110. Accepting that FIG. 6D illustrates the result used at step 116, it is noted that the five centres finally obtained are highly representative of the set Ln of probability distributions extracted from all the learning sequences. They are in any event appreciably more representative of the Ln probability distributions than the five initial centres of FIG. 6A.

In the light of the distribution D of the Ln normal distributions supplied as an example, it can also easily be imagined that it is this value 5 of Cn that will certainly provide the best result at step 118 and will be adopted at step 122.

FIG. 7 illustrates the allocation of states to the samples of a learning sequence of a cyclic activity such as swimming, on the basis of a cyclic model with one start state (state 1) and three cyclic states (states 2, 3 and 4) such as the one in FIG. 3, at the fifth iteration of the loop of steps 112-114-110. It will be observed that the distribution converging towards optimality is indeed cyclic as expected and corresponds well to the various states of the cyclic model chosen.

It appears clearly that a detection device such as the one described previously enables reconfigurations that are precise and as frequent as desired by its user. It is thus easy to adapt the detection device to the physical system observed, and even to changes over time in this physical system, since the hidden-state Markov statistical models on the basis of which it carries out its detection are not fixed.

It will moreover be noted that the invention is not limited to the embodiments described above.

In particular, the detection device can be designed in highly diverse forms since its observation 12, processing 14 and interface 16 modules are separable. Its design can thus adapt to the application envisaged and to the physical system observed.

Moreover, an algorithm other than the Baum-Welch algorithm may be envisaged, equivalent in terms of optimisation of parameters of a hidden-state Markov statistical model, for executing step 118, an algorithm other than the K-Means algorithm, equivalent in terms of non-supervised classification to many classes known a priori, for executing steps 108 to 114, and other centre-calculation metrics or methods, for executing step 110 and 112.

It will be clear more generally to a person skilled in the art that various modifications can be made to the embodiments described above, in the light of the teaching that has just been disclosed to him. In the following claims, the terms used must not be interpreted as limiting the claims to the embodiments disclosed in the present description but must be interpreted so as to include therein all equivalents that the claims aim to cover because of their wording and which a person skilled in the art is capable of predicting by applying his general knowledge to the implementation of the teaching that has just been disclosed to him.

The invention claimed is:

1. A method, implemented by processing circuitry of a detection device, for configuring the detection device for detecting a situation from a set of situations wherein a physical trait of an object is observed by at least one sensor, comprising the following steps:
    reception, by the at least one sensor which is physically attached to or proximal to the object, of a sequence of observation data for the object, referred to as a learning sequence, and corresponding to a given situation of the object,
    determination, by the processing circuitry of the detection device, from the learning sequence, of parameters of a hidden-state Markov statistical model recorded in storage means of the detection device and relating to the given situation, by prior initialisation of these parameters, and then updating of these initialised parameters,
    wherein the parameters of the hidden-state Markov statistical model relating to the given situation include a matrix $(a_{i,j})$ of transition probabilities of each hidden state i towards each other hidden state j of this hidden-state Markov statistical model,
    wherein the prior initialisation comprises the following steps:
    the statistical model in question comprising a given number Cn of hidden states, determination, by the processing circuitry, of a plurality of Ln probability distributions from the learning sequence, by dividing the sequence into Ln sub-sequences and allocating to each sub-sequence a probability distribution that models it statistically, the number Ln of determined probability distributions being greater than the number Cn of hidden states of the statistical model in question,
    distribution, by the processing circuitry, of the Ln determined probability distributions determined between the Cn various hidden states of the statistical model in question,
    determination, by the processing circuitry, for each hidden state of the statistical model in question and from the probability distributions allocated to this hidden state, of a single probability distribution representing this hidden state, and
    initialization, by the processing circuitry, of the parameters of the statistical model in question from the determined representative probability distributions,
    wherein, the statistical model in question further comprises impossible transition constraints, which correspond to coefficients of the matrix $(a_{i,j})$ of transition probabilities set to zero, between certain hidden states,
    wherein the distribution of the Ln determined probability distributions between the Cn various hidden states of the statistical model in question is done by global optimisation of a function of adaptation of these Ln probability distributions to the Cn various hidden states and to the impossible transition constraints, said function of adaptation including a term relating to the probabilities of transition from one state to another for each of the Ln sub-sequences with respect to a next one of the Ln sub-sequences, and
    wherein the method further comprises a step of configuring the detection device so that the statistical model in question includes the parameters determined by said prior initialisation and then said updating.

2. The method for configuring as claimed in claim 1, wherein the step of distribution comprises the execution of an iterative K-Means algorithm on a number of classes equal to the number Cn of hidden states of the statistical model in question, this iterative algorithm comprising, at each iteration:
    for each of the Ln probability distributions determined from the learning sequence, the association of this probability distribution with one of the classes, this association using the Kullback Leibler divergence and the impossible transition constraints, and
    the calculation, for each class, of a probability distribution representing its centre.

3. The method for configuring as claimed in claim 2, wherein the step of distribution comprises an initialisation of the iterative K-Means algorithm consisting of:
    sorting the Ln probability distributions in the sequential order of the sub-sequences with which they are associated in the learning sequence,
    distributing the Ln probability distributions sorted in the classes in this sequential order, from the first to the last class,
    for each class thus initialised, determining a probability distribution representing its centre.

4. The method for configuring as claimed in claim 2, wherein the function of adaptation of the Ln probability distributions to the Cn various hidden states and to the impossible transition constraints of the statistical model in question is, for a given distribution of the Ln probability distributions determined between the Cn various hidden states of the statistical model in question, this distribution being in accordance with the impossible transition constraints, a sum of Kullback Leibler distances between each Ln probability distribution determined and each probability distribution representing the centre of the hidden state associated in this distribution.

5. The method for configuring as claimed in claim 2, wherein:
the function of adaptation of the Ln probability distributions to the Cn various hidden states and to the impossible transition constraints of the statistical model in question is, for each distribution "a" of the Ln probability distributions determined from the learning sequence between the Cn various hidden states of the statistical model in question, a product between a function taking into account the Kullback Leibler divergence between each Ln probability distribution determined from the learning sequence and each probability distribution representing the centre of the hidden state that is associated with it in this distribution "a", and probabilities that each Ln probability distribution determined from the learning sequence is associated with the hidden state defined by the distribution "a", knowing the hidden state associated by the distribution "a" with the probability distribution preceding it in a given order of the Ln probability distributions issuing from the learning sequence,
the global optimisation of this adaptation function is achieved by execution of the Viterbi algorithm for the selection of a distribution that maximises it.

6. The method for configuring as claimed in claim 2, wherein, each Ln probability distribution being a normal distribution, the probability distribution representing the centre of a class Ki is a normal distribution determined by the calculation of its expectation $\mu_i$ and its variance $E_i$ according to the expectations $\mu_{i,j}$ and the variances $E_{i,j}$ of all the probability distributions of this class Ki, as follows:

$$\mu_i = \frac{1}{\text{Card}(Ki)} \sum_{j \in Ki} \mu_{i,j} \text{ and}$$

$$\Sigma_i = \frac{1}{\text{Card}(Ki)} \sum_{j \in Ki} (\Sigma_{i,j} + \mu_{i,j}^H \mu_{i,j}) - \mu_i^H \mu_i,$$

where Card is the "Cardinal" function and H is the Hermitian operator.

7. The method for configuring as claimed in claim 1, wherein the hidden-state Markov statistical model relating to the given situation is a left/right or cyclic model wherein a sequence or a cycle of hidden states is imposed.

8. An adaptive device for detecting a situation from a set of situations wherein a physical trait of an object is observed by at least one sensor is liable to be, from observation data of the physical system supplied by the sensor, comprising:
at least one sensor, which is configured to be physically attached or proximal to the object, for supplying a sequence of observation data of the object,
means for storing, for each situation in the set of situations, a hidden-state Markov statistical model,
processing circuitry, connected to the sensor and to the storage means, programmed to select one of the situations by comparing probabilities of these situations knowing the sequence of observation data, the probabilities being estimated on the basis of the statistical models stored,
wherein the processing circuitry is further programmed, on reception of a sequence identified as a learning sequence corresponding to a given situation of the physical system, to receive, by the at least one sensor, a sequence of observation data for the object, referred to as a learning sequence, and corresponding to a given situation of the object,
determine, from the learning sequence, parameters of a hidden-state Markov statistical model recorded in storage means of the detection device and relating to the given situation, by prior initialisation of these parameters, and then updating of these initialised parameters,
wherein the parameters of the hidden-state Markov statistical model relating to the given situation include a matrix $(a_{i,j})$ of transition probabilities of each hidden state i towards each other hidden state j of this hidden-state Markov statistical model,
wherein the prior initialisation comprises the following steps:
the statistical model in question comprising a given number Cn of hidden states, determination of a plurality of Ln probability distributions from the learning sequence, by dividing the sequence into Ln sub-sequences and allocating to each sub-sequence a probability distribution that models it statistically, the number Ln of determined probability distributions being greater than the number Cn of hidden states of the statistical model in question,
distribution of the Ln determined probability distributions determined between the Cn various hidden states of the statistical model in question,
determination, for each hidden state of the statistical model in question and from the probability distributions allocated to this hidden state, of a single probability distribution representing this hidden state, and
initialisation of the parameters of the statistical model in question from the determined representative probability distributions,
wherein, the statistical model in question further comprises impossible transition constraints, which correspond to coefficients of the matrix $(a_{i,j})$ of transition probabilities set to zero, between certain hidden states, the distribution of the Ln determined probability distributions between the Cn various hidden states of the statistical model in question is done by global optimisation of a function of adaptation of these Ln probability distributions to the Cn various hidden states and to the impossible transition constraints, said function of adaptation including a term relating to the probabilities of transition from one state to another for each of the Ln sub-sequences with respect to a next one of the Ln sub-sequences, and
wherein the processing circuitry configures the adaptive device so that the statistical model in question includes the parameters determined by said prior initialisation and then said updating.

9. The adaptive device as claimed in claim 8, wherein the at least one sensor comprises at least one of the elements of the set consisting of a movement sensor with at least one measurement axis, a pressure sensor, a cardiometer and a glycaemia sensor.

10. The method for configuring as claimed in claim 3, wherein the function of adaptation of the Ln probability distributions to the Cn various hidden states and to the impossible transition constraints of the statistical model in question is, for a given distribution of the Ln probability distributions determined between the Cn various hidden states of the statistical model in question, this distribution being in accordance with the impossible transition constraints, a sum of Kullback Leibler distances between each of the Ln probability distributions determined and each probability distribution representing the centre of the hidden state associated in this distribution.

11. The method for configuring as claimed in claim 3, wherein:
the function of adaptation of the Ln probability distributions to the Cn various hidden states and to the impossible transition constraints of the statistical model in question is, for each distribution "a" of the Ln probability distributions determined from the learning sequence between the Cn various hidden states of the statistical model in question, a product between a function taking into account the Kullback Leibler divergence between each Ln probability distribution determined from the learning sequence and each probability distribution representing the centre of the hidden state that is associated with it in this distribution "a", and probabilities that each Ln probability distribution determined from the learning sequence is associated with the hidden state defined by the distribution "a", knowing the hidden state associated by the distribution "a" with the probability distribution preceding it in a given order of the Ln probability distributions issuing from the learning sequence,
the global optimisation of this adaptation function is achieved by execution of the Viterbi algorithm for the selection of a distribution that maximises it.

12. A non-transitory computer-readable recording medium for storing therein a computer program that includes instructions which when executed by processing circuitry of a detection device, causes the processing circuitry to execute a method for configuring the detection device for detecting a situation from a set of situations wherein a physical trait of an object is observed by at least one sensor, the method comprising the following steps:
reception, by the at least one sensor which is physically attached to or proximal to the object, of a sequence of observation data for the object, referred to as a learning sequence, and corresponding to a given situation of the object,
determination, by the processing circuitry of the detection device, from the learning sequence, of parameters of a hidden-state Markov statistical model recorded in storage means of the detection device and relating to the given situation, by prior initialisation of these parameters, and then updating of these initialised parameters,
wherein the parameters of the hidden-state Markov statistical model relating to the given situation include a matrix $(a_{i,j})$ of transition probabilities of each hidden state i towards each other hidden state j of this hidden-state Markov statistical model,
wherein the prior initialisation comprises the following steps:
the statistical model in question comprising a given number Cn of hidden states, determination, by the processing circuitry, of a plurality of Ln probability distributions from the learning sequence, by dividing the sequence into Ln sub-sequences and allocating to each sub-sequence a probability distribution that models it statistically, the number Ln of determined probability distributions being greater than the number Cn of hidden states of the statistical model in question,
distribution, by the processing circuitry, of the Ln determined probability distributions determined between the Cn various hidden states of the statistical model in question,
determination, by the processing circuitry, for each hidden state of the statistical model in question and from the probability distributions allocated to this hidden state, of a single probability distribution representing this hidden state, and
initialization, by the processing circuitry, of the parameters of the statistical model in question from the determined representative probability distributions,
wherein, the statistical model in question further comprises impossible transition constraints, which correspond to coefficients of the matrix $(a_{i,j})$ of transition probabilities set to zero, between certain hidden states,
wherein the distribution of the Ln determined probability distributions between the Cn various hidden states of the statistical model in question is done by global optimisation of a function of adaptation of these Ln probability distributions to the Cn various hidden states and to the impossible transition constraints, said function of adaptation including a term relating to the probabilities of transition from one state to another for each of the Ln sub-sequences with respect to a next one of the Ln sub-sequences, and
wherein the method further comprises a step of configuring the detection device so that the statistical model in question includes the parameters determined by said prior initialisation and then said updating.

* * * * *